Sept. 11, 1956 W. P. SCHMITTER 2,762,228
POWER TRANSMISSION
Original Filed May 12, 1949 2 Sheets—Sheet 2
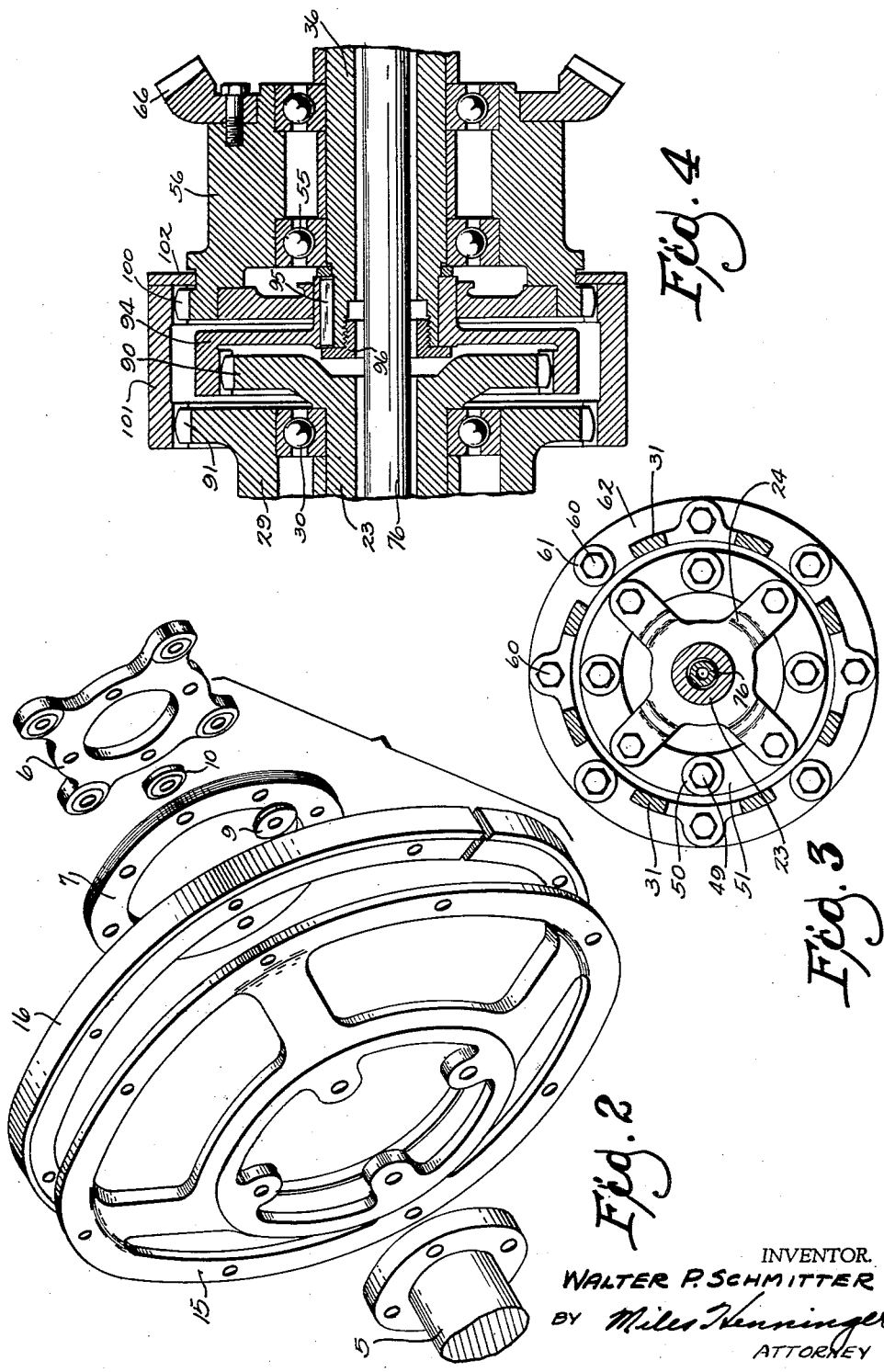
INVENTOR.
WALTER P. SCHMITTER
BY Miles Henninger
ATTORNEY

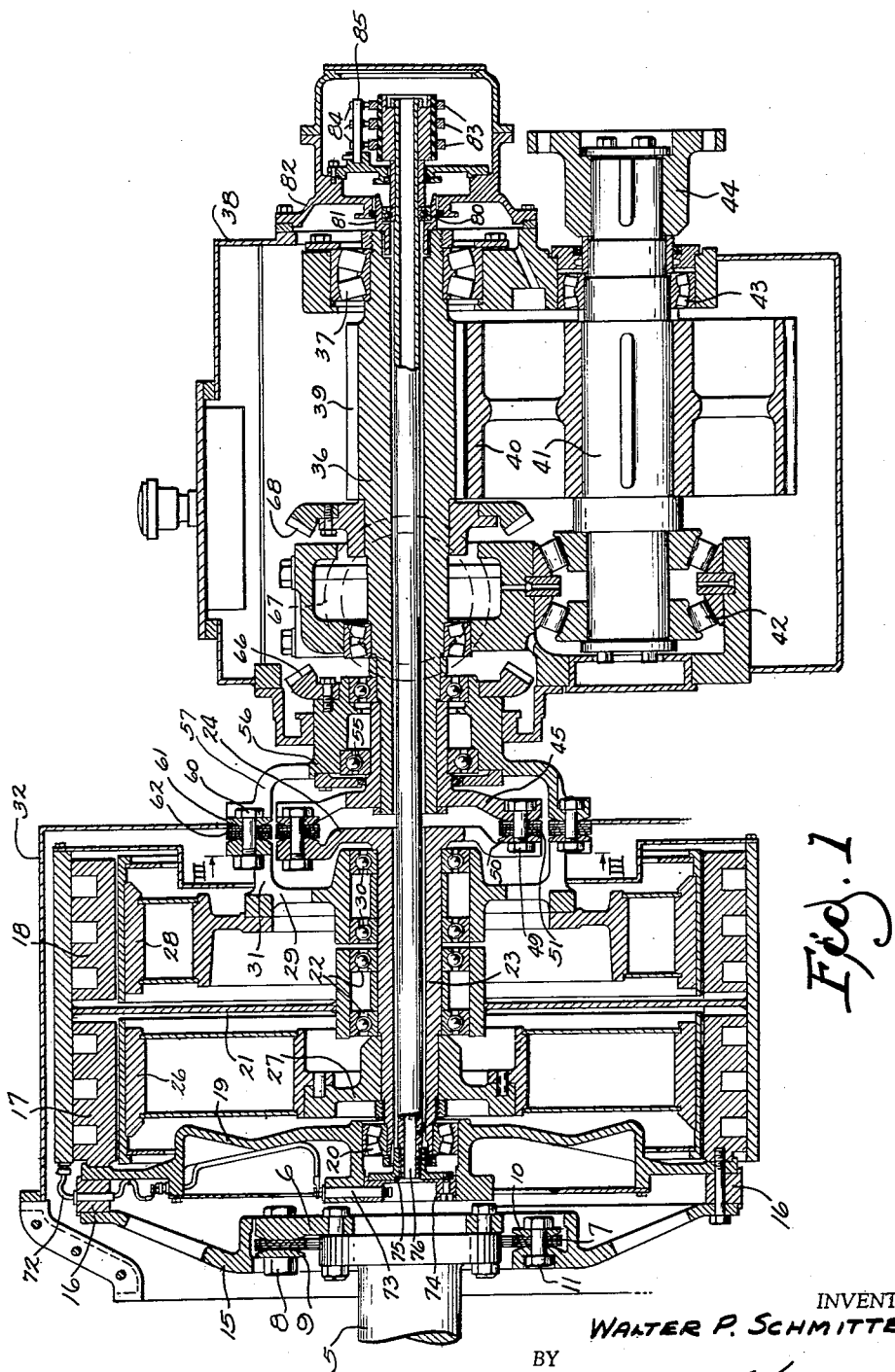

United States Patent Office 2,762,228
Patented Sept. 11, 1956

2,762,228
POWER TRANSMISSION

Walter P. Schmitter, Wauwatosa, Wis., assignor to The Falk Corporation, Milwaukee, Wis., a corporation of Wisconsin Substituted for and continuation of Serial No. 92,767, May 12, 1949. This application August 24, 1951, Serial No. 243,518

12 Claims. (Cl. 74—330)

This invention relates to power transmissions.

This application is a substitute for and a continuation of my copending application Serial No. 92,767, filed May 12, 1949, for Power Transmission.

In many drives, such as ships' propeller drives, power is transmitted through a clutch and reversible reduction gearing the servicing of which is difficult and time consuming because of space limitations. Even with the most rugged clutches known, it becomes necessary to do maintenance work thereon from time to time, and it is quite desirable to have full and complete access to the parts thereof at such times. It is also desirable to have full and ready access to the gearing and to other parts associated with the transmission with a minimum loss of time. In ships' drives, particularly, such access to many of the parts can not be had in situ and, as heretofore combined and arranged, such parts can be reached only by dismantling the transmission or major portions thereof, a task which is not only time consuming but, at times prohibitive, particularly when at sea.

It is, therefore, an object of the present invention to provide a power transmission involving a clutch and gear assembly so constructed and arranged as to permit ready removal of the clutch, as a unit, without disturbing the gear assembly, so as to render the parts of both readily accessible for inspection, replacement or repair.

Another object of the invention is to provide a transmission having a clutch and a gear joined by connectors of high torque capacity, and at the same time possessing the qualities of quick releasability and ruggedness and other qualities contributing to smoothness of operation.

Another object of the invention is to provide a clutch and gearing combination which will be readily separable and replaceable and which will avoid difficulties normally resulting from misalignment of the axes thereof upon removal and replacement of either of the major parts of the combination.

Another object is to provide in a power transmission a clutch mechanism so connected and arranged as to permit the same to float angularly, as a unit, between the driving and driven mechanisms connected thereby, so as to accommodate angular and parallel misalignment between said mechanisms. A transmission involving a clutch, thus arranged, may be utilized to particular advantage when employed as a part of a marine propulsion system, since it may yield to distortions, such as commonly occur in the hull of a ship, without imposing objectionable stresses within the clutch or within the mechanisms to which the clutch is connected.

Objects and advantages other than those above set forth will be apparent from the following description when read in connection with the accompanying drawing in which:

Figure 1 is a longitudinal sectional view on a plane taken vertically through the axes of a structure embodying the present invention;

Fig. 2 is an "exploded" perspective of the coupling employed between the driving shaft and clutch, in the structure shown in Fig. 1;

Fig. 3 is a cross-sectional view on the plane of line III—III of Fig. 1; and

Fig. 4 is a fragmentary view of a modification of a portion of the present construction.

For purposes of illustration and explanation, the invention is shown and described as embodied in a reversible drive mechanism for marine propulsion systems, although the same may be used to advantage in drive mechanisms of other types and for other purposes. Generally, the illustrated embodiment comprises a clutch unit, including selectively operable forward and reverse clutches, the unit being shown connected to a driver and to a gear set driven thereby through torque transmitting connections, which are releasable to permit radial withdrawal of the unit from the transmission and flexible to permit some misalignment between the driver and the gear set so as to avoid objectionable stresses that might otherwise be imposed on the elements of the clutch or other connected parts as a result of misalignment.

Referring to the drawing in which like numerals designate like parts, 5 designates a shaft which is driven in one direction of rotation by a suitable source of power (not shown) and which bears a portion of one of the readily releasable connecting means of the present structure. Such means are shown as comprising (see especially Fig. 2) a ring 6 bolted to a flange on the shaft 5 and formed with bevel faced ears on which are seated a plurality of relatively thin flexible rings 7. Bolts 8 extend through the ears on the ring 6 and, through bevel faced washers 9, to attach the rings 7 to the ring 6. The flexible rings are also fastened by bevel faced washers 10 and bolts 11 to a supporting wheel-like member 15, the whole forming a connector permitting some misalignment of the axes of the driving shaft and a clutch unit and absorbing some shocks.

Member 15 is connected through a split ring 16 with the driving members 17 and 18 of a clutch unit, each of which driving members is slotted to receive a plurality of electrical windings (not shown). Such driving clutch members are also supported by a wheel-like member 19 on bearings 20 and wheel-like member 21 on bearings 22 supported on a shaft 23, the shaft having a spider-like member 24 at one end for a purpose to be described. Driving clutch member 17 coacts with a driven member 26 which is mounted on a hub 27 fixed on shaft 23 and driving member 18 coacts with a driven member 28 which is mounted on a hub 29 supported on bearing 30 on the shaft 23. The hub 29 has an end provided with a spider-like member 31 for a purpose to be described. The whole clutch unit is enclosed within a suitable housing indicated at 32.

It will be noted that the shaft 23 coacts with the hub 27 and the several bearings 20, 22, and 30 and the parts supported thereby to maintain a concentric relation between the driving members 17 and 18 and the driven members 26 and 28 of the dual clutch shown, so that the annular gap therebetween is accurately maintained at a desired uniform thickness.

The clutch unit is connected with a reversible reduction gear set which has a plurality of input shafts to be driven through the clutch, and includes a shaft 36 mounted in axially spaced bearings 37 and 37' in a housing 38, the shaft 36 having a pinion 39 formed integral therewith or fixed thereon. The pinion 39 meshes with gear 40 which is mounted on a shaft 41 supported in bearings 42, 43 in the housing 38, the shaft 41 having fixed thereto a flange 44 for connection with a shaft to be driven and not shown. The pinion 39 and gear 40 constitute a speed reduction gear set driven by the clutch unit.

The pinion shaft 36 has fixed thereto a spider-like member 45 which co-acts with spider 24 on shaft 23 for connecting such shafts by way of a flexible coupling. The arms of spiders 24 are bevel faced and are severally connected by bolts 49 and bevel faced washers 50 with a plurality of flexible rings 51 which form a flexible coupling between shafts 23 and 36.

Shaft 36 provides support for bearings 55 on which is mounted a hollow shaft or sleeve 56 formed at one end with a spider-like member 57 co-acting with the spider 31 on clutch hub 29 for forming a flexible coupling. The arms of spiders 31 and 57 are bevel faced and are severally connected by bolts 60 and bevel faced washers 61 with a plurality of flexible rings 62 to form a flexible coupling between the clutch hub 29 and the shaft 56.

The other end of the shaft 56 has mounted thereon a bevel gear 66 meshing with two co-axial bevel gears, one of which is indicated at 67 and which in turn mesh with a bevel gear 68 fixed on the shaft 36, all as disclosed in the U. S. Patent 2,304,030 issued to Walter P. Schmitter on December 1, 1942.

The clutch has been described as including a plurality of electrical windings associated severally with the coupling driving members 17 and 18 and means is provided for supplying electric current to such windings. Electrical connections are taken from the windings as indicated at 72 to one of several binding posts 73 in clutch member 19. Posts 73 extend through a ring 74 joined with a flanged collar 75 which is fixed to one end of an electrical conduit 76. An electrical receptacle (not shown) is mounted on post 73 to receive the ends of electrical conductors (not shown) extending through conduit 76 for supplying electric current to the windings on clutch members 17 and 18. All of such construction is well known and is accordingly not illustrated as detrimental to clarity of illustration of mechanical parts shown.

Shafts 23 and 36 are axially aligned and are hollow to receive the conduit 76 which projects beyond the ends of the shaft 36. The one projecting end of the conduit 76 is supported in a bearing 80 mounted in a sleeve 81 which is fixed in a housing 82 secured to the gear housing 38. The other projecting end of the conduit 76 bears a triple slip ring structure 83 by which the conductors to the windings of coupling members 17 and 18 may be independently energized and such slip rings are severally contacted by electrical brushes 84 supported in a brush rigging 85 mounted on the housing 82. The brushes are severally connected with a suitable source of direct current electrical power (not shown), the one brush being a common return line from the clutch windings to the source of power.

For forward driving, the windings of the coupling driving member 17 are energized and such driving member is magnetically engaged with the coupling driven member 26 and shaft 23 for transmitting power thereto. The shaft 23 is connected by flexible coupling 49, 50, 51 with the shaft 36 so that gear 39 drives gear 40 and output shaft 41. When power is to be delivered in the direction reverse from the given direction, the windings of clutch driving member 18 are energized and such driving member is magnetically engaged with clutch driven member 28 for the transmission of power to clutch hub 29. Hub 29 is connected by flexible coupling 60, 61, 62 with shaft 56 to actuate the bevel gearing 66, 67, 68 for rotating shaft 36 in the reverse direction. It will be understood that the circuits supplying power to the windings of the clutch driven members 17 and 18 are so interlocked that connection of the windings on one of the driving members automatically disconnects the windings on the other driving member.

The above structure makes it possible to control the flow of power from a full power flow in a given direction to a full power flow in the reverse direction, in the minimum of time and without the transmission of shocks. The reversal of direction in power flow is in fact expedited by simultaneously energizing one set of windings and de-energizing the other set of windings. When it is desired to do maintenance or repair work on either the clutch or the gear, the bolts joining clutch member 15 and ring 16 are removed and the two parts of the ring 16 are disconnected so that such ring parts may be removed. The electrical conductors extending through the conduit 76 are disconnected from the electrical receptacle attached to the binding posts 73. The gear set end plate adjacent the electrical brush structure 84, 85 is removed. The electrical brush rigging 85 is then pivoted to swing the brushes 84 away from the slip rings 83 and the conduit 76 is drawn toward the right to clear clutch shaft 23, the conduit slipping out of the collar 75 and through the bearing 80. The coupling bolts 49 and 60 are then removed and the sets of coupling rings 51 and 62 may be removed. The clutch 17—32 can then be bodily moved at right angles to the axis thereof to provide working space about the gearing 36—68 or to allow full access to all parts of the clutch. Being supported on shafts 5, 36 and hub 29 co-acting with shaft 56, there is little possibility of misaligning the clutch upon replacement thereof between the driving shaft 5 and the gearing.

From the foregoing it will be noted that the power input end of the clutch unit is supported by a flexible coupling, including the rings 6 and 15 and interconnecting flexible rings 7, and constituting a flexible driving connection between it and the driver 5, while the output end of the clutch unit is similarly supported by two flexible couplings, one including the spiders 24 and 45 and interconnecting rings 51 and the other including the spiders 31 and 57 and interconnecting rings 62, and through which each of the driven members 26 and 28 of the clutch are separately flexibly connected to the speed reduction gear set. Supported and connected in this manner the clutch unit is angularly floatable and thus free to accommodate itself to both parallel and angular misalignment between the driver 5 and the gear set and thereby avoiding objectionable loads or stresses that might otherwise be imposed on the elements of these connected members as a result of such misalignment.

Other types of flexible couplings might be employed at one or both ends of the clutch unit. For instance, dental couplings might be employed, as indicated in Fig. 4. As therein shown, the shaft 23 is provided with a peripherally toothed end flange 90 and clutch hub 59 is formed with a peripherally toothed end flange 91. Gearing shaft 36 has fixed thereto a disc 94 as by means of a key 95 and a nut 96 threaded into shaft 36. Such disc 94 is peripherally flanged and is internally toothed as in a ring gear to engage the teeth of clutch shaft flange 90 and form therewith a releasable dental coupling. Gearing shaft 56 is also flanged and toothed as at 100 and a sleeve 101 is internally toothed to engage with the teeth 91 and 100. The sleeve 101 is held in position by a split ring 102 engageable in a clutch adjacent the teeth 100 on shaft 56.

When it is desired to disengage the clutch and gear parts of the construction shown in Fig. 4, the two parts of ring 102 are separated and are removed so that the sleeve 101 may be slid over shaft 56 to disengage from teeth 91 on the clutch shaft 29. The entire clutch may then be moved toward the left of Fig. 1 by substantially the thickness of ring 16, to disengage teeth 90 from ring gear 94. The conduit 76 is then withdrawn from the right of Fig. 1, thus removing the last connection between shafts 23 and 36. It is then possible to move the clutch unit at right angles to the axis of the transmission to provide space about the gearing or to service the clutch itself.

It will thus be seen that the present device provides a power transmission in which a clutch is connected between the power supply shaft and the gearing by means which may be readily removed and replaced to allow complete removal of either of the transmission devices at right angles to the axis of the combination. Some of such connectors are shown as being flexible while other connectors are shown as being toothed or dental connectors, but it will be understood that either type of connector may be used in place of the other type.

Although but a few embodiments of the present invention have been illustrated and described, it will be apparent to those skilled in the art that various changes and modifications may be made therein without departing from the spirit of the invention or from the scope of the appended claims.

I claim:

1. In a power transmission, the combination of a driver, a gear set, a clutch unit disposed between said driver and gear set and providing a releasable driving connection therebetween, torque transmitting coupling means between said driver and said clutch unit, and torque transmitting coupling means between said clutch unit and said gear set, both of said coupling means constituting supports for said clutch unit and being readily releasable to permit withdrawal of said clutch unit radially from the transmission without disturbing said driver or any of the gears of said gear set, and both of said coupling means being flexible so as to render said clutch unit free to float so as to accommodate both angular and parallel misalignment between said driver and gear set.

2. In a power transmission, the combination of a driver, a gear set, a clutch unit therebetween for controlling the operation of said gear set, coupling means connecting said driver in driving relation with said clutch unit, and coupling means connecting said clutch unit in driving relation with said gear set, both of said coupling means being flexible to render said clutch unit free to float so as to accommodate both angular and parallel misalignment between said driver and said gear set.

3. In a power transmission, the combination of a driver, a gear set, and a clutch unit therebetween for controlling the operation of said gear set, said clutch unit including a driving clutch member flexibly connected to said driver, a driven clutch member flexibly connected to said gear set, and means interconnecting said driving and driven clutch members to maintain a coaxial relation therebetween whereby parallel or angular misalignment between said driver and gear set is incapable of imposing objectionable stresses therein or in said clutch unit.

4. In a power transmission, the combination of a driver, a driven mechanism, and a clutch unit therebetween for controlling the operation of said driven mechanism, said clutch unit including a driving clutch member flexibly connected to said driver, a driven clutch member flexibly connected to said driven mechanism, and means for maintaining a coaxial relation between said driving and driven clutch members while permitting angular displacement of said clutch unit relative to said driver and said driven mechanism to accommodate parallel and angular misalignment between the latter.

5. In a power transmission, the combination of a driver, a driven mechanism including a plurality of shafts, a clutch unit therebetween for controlling the operation of said driven mechanism, said clutch unit including a plurality of selectively engageable clutches, coupling means connecting said driver in driving relation with said clutch unit, and coupling means connecting said clutch unit in driving relation with said driven mechanism, both of said coupling means being flexible to render said clutch unit free to float so as to accommodate parallel and angular misalignment between said driver and said driven mechanism.

6. In a power transmission, the combination of a driver, a gear set axially spaced therefrom and including a plurality of coaxial shafts, a clutch unit closely confined within the space between said driver and gear set, said clutch unit including a plurality of selectively engageable coaxial clutches, a releasable coupling connecting said driver to said clutch unit, and separate releasable coaxial couplings severally connecting said selectively engageable clutches to said shafts, said clutch unit being supported by said couplings, and the arrangement of said couplings being such that release of said couplings renders said clutch unit withdrawable radially from between said driver and gear set without disturbing either of the latter.

7. In a power transmission as defined in claim 1, wherein said couplings are flexible and said clutch unit is floatingly supported by and between the same.

8. In a power transmission the combination of a driver, a gear set axially spaced from said driver and including a plurality of coaxial shafts, a clutch unit between said driver and gear set, said clutch unit including a plurality of selectively engageable coaxial clutches, a coupling for connecting said driver in driving relation with said clutch unit, and separate coaxial couplings for severally connecting said selectively engageable clutches to said shafts, all of said couplings being flexible to render said clutch unit free to accommodate misalignment between said driver and gear set.

9. A power transmission, as defined in claim 8, wherein said clutch unit includes means for maintaining a coaxial relation between said selectively engageable clutches.

10. A power transmission, as defined in claim 8, wherein said selectively engageable clutches include driving and driven clutch members, and interconnecting means for maintaining a coaxial relation between said clutch member.

11. In a power transmission, the combination of a driver, a gear set axially spaced therefrom, a clutch unit between said driver and gear set, a flexible coupling supported by said driver for driving said clutch unit, and a flexible coupling supported by said gear set for driving the same, said couplings being attached to said clutch unit to floatingly support the same whereby said clutch unit is free to accommodate misalignment between said driver and said gear set.

12. A power transmission, as defined in claim 9, wherein said clutch unit includes driving and driven clutch members, and rigid interconnecting means maintaining a coaxial relation between said clutch members.

References Cited in the file of this patent

UNITED STATES PATENTS

| | | |
|---|---|---|
| 1,043,406 | Denio | Nov. 5, 1912 |
| 1,790,285 | Spase | Jan. 27, 1931 |
| 1,923,307 | Hathaway | Aug. 22, 1933 |
| 2,167,705 | Batten | Aug. 1, 1939 |
| 2,251,722 | Thomas | Aug. 5, 1941 |
| 2,304,030 | Schmitter | Dec. 1, 1942 |
| 2,357,509 | Falk | Sept. 5, 1944 |
| 2,556,624 | Macbeth | June 12, 1951 |
| 2,565,558 | Highberg | Aug. 28, 1951 |
| 2,582,220 | Beckwith | Jan. 15, 1952 |